(12) United States Patent
Peterson et al.

(10) Patent No.: US 6,185,047 B1
(45) Date of Patent: Feb. 6, 2001

(54) IMAGE PROJECTION SYSTEM PACKAGED TO OPERATE LYING FLAT WITH A VERY LOW PROFILE

(75) Inventors: Mark Peterson, Lake Oswego; Scott Engle, Tualatin; Franc Potekev, Wilsonville, all of OR (US)

(73) Assignee: InFocus Corporation, Wilsonville, OR (US)

(*) Notice: Under 35 U.S.C. 154(b), the term of this patent shall be extended for 0 days.

(21) Appl. No.: 09/405,425

(22) Filed: Sep. 22, 1999

Related U.S. Application Data

(60) Provisional application No. 60/134,473, filed on May 17, 1999.

(51) Int. Cl.[7] .............................. G02B 27/12; G02B 3/00; G02B 21/28
(52) U.S. Cl. ............................. 359/640; 359/649; 353/81
(58) Field of Search ...................................... 359/649–651, 359/629, 638–640, 720, 831, 833–837; 353/30–31, 33, 81; 348/744, 759, 770–771

(56) References Cited

U.S. PATENT DOCUMENTS

| | | | |
|---|---|---|---|
| 548,495 | 10/1895 | Abbe | 359/833 |
| 957,502 | 5/1910 | Dupuis | 353/66 |
| 3,659,918 | 5/1972 | Tan | 313/371 |
| 3,932,027 | 1/1976 | Cook et al. | 359/583 |
| 4,084,180 | 4/1978 | Stoffels et al. | 348/338 |
| 4,969,730 | 11/1990 | van den Brandt | 353/31 |
| 5,786,934 * | 7/1998 | Chiu et al. | 359/494 |
| 6,062,694 * | 5/2000 | Oikawa et al. | 353/31 |

FOREIGN PATENT DOCUMENTS

| 3901166 | 7/1990 | (DE) | G03H/1/22 |
|---|---|---|---|

OTHER PUBLICATIONS

Defensive Publication No. T938,006, Sep. 2, 1975, Joseph F. Stephany.

* cited by examiner

*Primary Examiner*—Georgia Epps
*Assistant Examiner*—Jordan M. Schwartz
(74) *Attorney, Agent, or Firm*—Stoel Rives LLP

(57) ABSTRACT

An image projection system implemented with a projector engine using a reflective light modulator, preferably a Digital Micromirror Device (DMD), operates lying flat with very low profile on a support table. The invention overcomes the disadvantage of previous DMD projectors that require either tilting all or part of the projection system 45 degrees relative to a support table top or packaging the projection system in a thick box that allows light to impinge on the DMD from above or below its light reflecting surface. This is accomplished with a prism assembly that sets up the correct illumination angles for the DMD and directs imaging (output) light along approximately the same vector as that of illumination (input) light incident to the prism assembly. The illumination light and imaging light do not propagate in a common plane within the prism assembly, but the vectors of the illumination light entering and the imaging light exiting the prism assembly are approximately the same. An alternative preferred embodiment of the prism assembly includes a light escape window through which illumination light reflected by the DMD in its off-state escapes from the prism assembly in a direction away from the projection lens. An implementation using a third prism optically fixed to an output prism or forming an integral part of an enlarged output prism is especially advantageous because it can provide a three-point mounting of the prism assembly to the floor of the interior of the projection system housing.

18 Claims, 14 Drawing Sheets

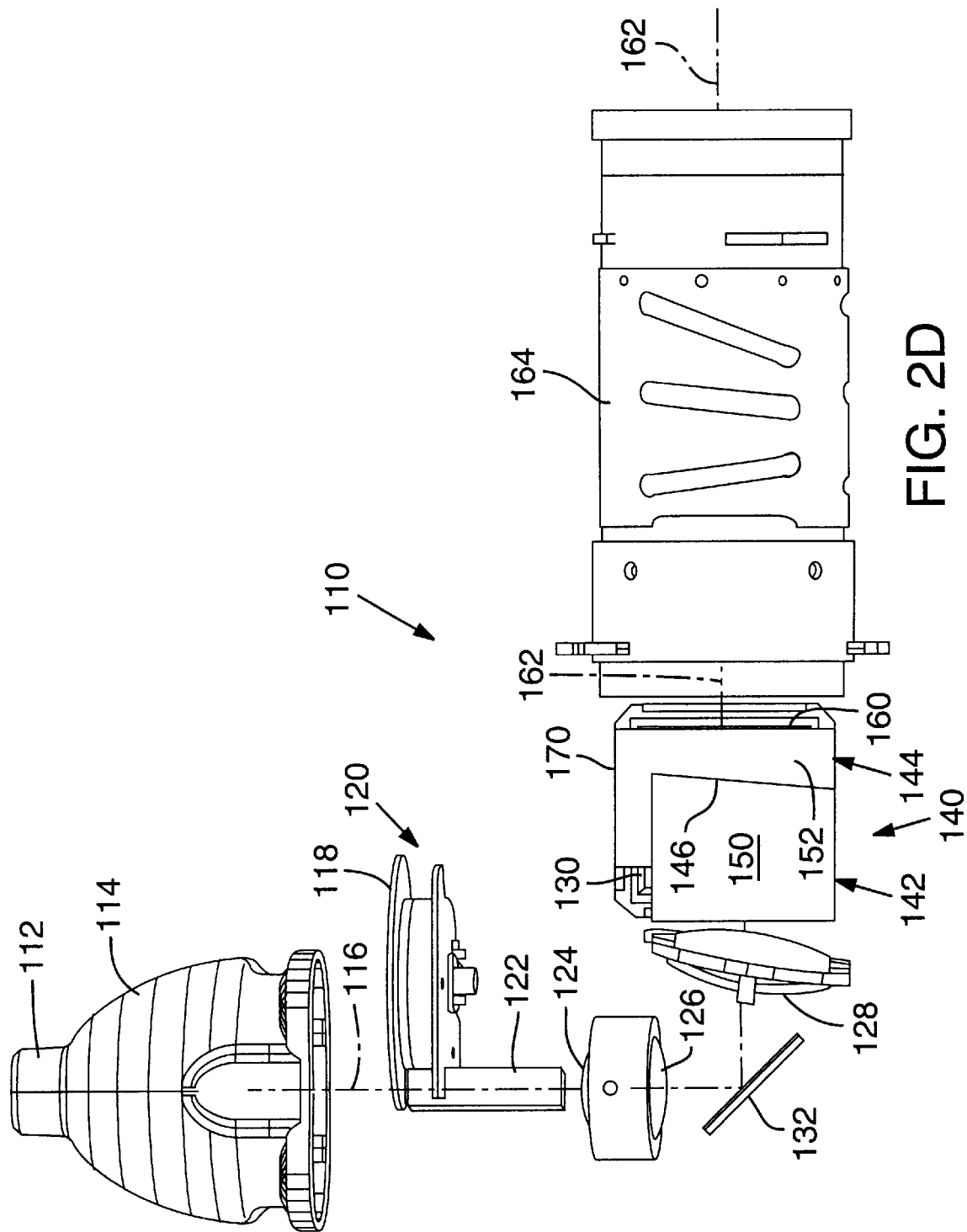

US 6,185,047 B1

IMAGE PROJECTION SYSTEM PACKAGED TO OPERATE LYING FLAT WITH A VERY LOW PROFILE

RELATED APPLICATION

This application claims the benefit of U.S. Provisional Application No. 60/134,473, filed May 17, 1999.

TECHNICAL FIELD

This invention relates to image display systems and, in particular, to an image projection system implemented with a reflective light element and packaged to operate lying flat with very low profile on a support table.

BACKGROUND OF THE INVENTION

The following description is presented with reference to an image projector implemented with a reflective light modulator of a digital micromirror device (DMD) type but is applicable also to image projectors implemented with other types of reflective light modulators. Image projectors currently implemented with DMDs require that the projector housing or DMD-illuminating light beam-directing optics contained within the projector housing be tilted at a 45 degree angle relative to a support table on which the image projector rests. This is done to cause the illuminating light to impinge on the DMD from either above or below its light reflecting surface and thereby provide a correct orientation of the DMD relative to a projection screen on which an image can be viewed. Inclining the projector or its components causes the projector to occupy an undesirably tall space when it is in use. Currently available single DMD projectors are taller than 10 cm in their operating positions. Using a tilting mechanism to thin the profile to less than 10 cm requires a tilting mechanism that raises the operating height by a corresponding amount.

FIGS. 1A, 1B, 1C, and 1D are respective isometric, frontal, side elevation, and top plan views of such a prior art image projector. With reference to FIGS. 1A, 1B, 1C, and 1D, a prior art image projector 10 includes a high power lamp 12 positioned at the focus of an elliptical reflector 14 to produce a high intensity illumination beam characterized by a principal ray 16 that propagates through a rotating color wheel disk 18 of a color wheel assembly 20. Disk 18 includes at least three sectors, each tinted in a different one of three primary colors to provide a field sequential color image capability for image projector 10. The illumination beam propagates through an integrator tunnel 22 to create at its output end a uniform illumination pattern that lens elements 24, 26, and 28 image onto a DMD 30.

The illumination beam propagating from integrator tunnel 22 is directed by a mirror 32 that is inclined so that the illumination beam propagates upwardly at a 45 degree angle relative to the plane of the supporting table for image projector 10 and exits lens element 26 toward a prism assembly 40. Prism assembly 40 is composed of prism components 42 and 44 that are spaced apart by an air space interface 46. After reflection by mirror 32, principal ray 16 of the illumination beam strikes a surface of lens element 28.

An incident light beam derived from principal ray 16 propagates through prism component 42 and, by total internal reflection, reflects off of a surface 50 at air space interface 46 to form a reflected incident light beam. The reflected incident beam propagates through prism component 42 to strike DMD 30. DMD 30 in its "on" light reflecting state (on-state) reflects an imaging light beam propagating normal to the plane of DMD 30 through prism component 42 and, without total internal reflection, through air space interface 46 into prism 44 to exit through an exit face 60 of prism component 44. The imaging light beam that passes through exit face 60 is characterized by a principal ray 62 and propagates through a projection lens 64 to a projector screen (not shown) to display an image to a viewer. DMD 30 in its "off" light reflecting state (off-state) reflects light by total internal reflection off of a face 68 of prism component 44.

The angles of the faces and the shapes of prism components 42 and 44 are selected so that the incident light beam, reflected incident light beam, and imaging light beam propagating within prism assembly 40 are coplanar. The arrangement of the components of image projector 10 results in the upward inclination of prism assembly 40 and thereby dictates for a housing (not shown) of projector 10 a minimum height that is greater than a minimum height that would be possible with an uninclined prism assembly and principal rays 16 and 62 propagating along essentially the same vector.

SUMMARY OF THE INVENTION

The invention is an image projection system implemented with a projector engine using a reflective light modulator, preferably a Digital Micromirror Device (DMD), and operating lying flat with very low profile on a support table. The invention overcomes the above-described disadvantage of previous DMD projectors that require either tilting all or part of the projection system 45 degrees relative to a support table top or packaging the projection system in a thick box that allows light to impinge on the DMD from above or below its light reflecting surface. This is accomplished with a prism assembly that sets up the correct illumination angles for the DMD and directs imaging (output) light along approximately the same vector as that of illumination (input) light incident to the prism assembly.

The prism assembly includes compensating and output prism components having opposed surfaces separated by a light beam separation boundary, which is preferably an air space. The prism assembly sets up a correct illumination angle on the DMD and then separates illumination light from imaging light by total internal reflection discrimination. In a preferred embodiment, illumination light travels upwardly at 8 degrees relative to the surface of a support table (hereafter referred to as the horizontal datum plane) and in a direction such that its projection onto the horizontal datum plane is parallel to the projection of the optical axis of a projection lens that receives light exiting the prism assembly. The illumination light enters the prism assembly and reflects by total internal reflection off a top surface of the compensating prism component. The top surface has relative to the three-dimensional DMD coordinate system a compound angle that directs the light toward the DMD at the correct angle for illumination. In a preferred embodiment, the angle of this first reflected light beam is tilted 24 degrees (16 degrees in the prism glass) from the normal of the horizontal datum plane and is less than the critical angle of the glass from which the first prism component is formed at the air gap interface surface. The projection of this first reflected light beam onto the horizontal datum plane is rotated 40 degrees from the projection of the optic axis of the projection lens onto the same horizontal datum plane. The light passes, therefore, through the air space between the first and second prism components. For each micromechanical mirror of the DMD in its on-state, the illumination light reflects at 4 degrees from the normal of the horizontal datum plane to form imaging light, the projection of which onto the horizontal datum plane is parallel to the projection of the optical axis of the projection lens. The imaging light reenters the prism assembly through the output prism component. Because the angle of incidence at the air gap interface surface is greater than the critical angle, the imaging light reflects off the air gap and propagates through the output prism component. The imaging light exits the prism assembly, traveling upwardly at +4 degrees from the horizontal datum plane toward a projection lens. The illumination light and imaging light do not propagate along a common plane within the prism assembly, but the vectors of the illumination light entering and the imaging light exiting the prism assembly are approximately the same.

The DMD in a preferred implementation is positioned face up and, therefore, can be mounted on one printed circuit board that covers the interior bottom of the projection system. This arrangement is less expensive than the alternative of using a high-density connector at right angles to the DMD control electronics for the printed circuit board and support surface to hold the DMD.

An alternative preferred embodiment of the prism assembly includes a light escape window through which light reflected by the DMD in its off-state escapes from the prism assembly in a direction away from the projection lens and is not absorbed into the prism. The light escape window is preferably either a third prism optically fixed to or an integral part of the prism assembly or a faceted array optically fixed to the prism assembly. An implementation using the third prism is especially advantageous because it can provide a three-point mounting of the prism assembly to the floor of the interior of the projection system housing.

Additional objects and advantages of the present invention will be apparent from the following detailed description of preferred embodiments thereof, which proceeds with reference to the accompanying drawings.

BRIEF DESCRIPTION OF THE DRAWINGS

FIGS. 2A, 2B, 2C, 2D, and 2E are respective isometric, frontal, side elevation, top plan, and rear end views of a preferred embodiment of the present invention.

DETAILED DESCRIPTION OF PREFERRED EMBODIMENTS

Figure 1A:
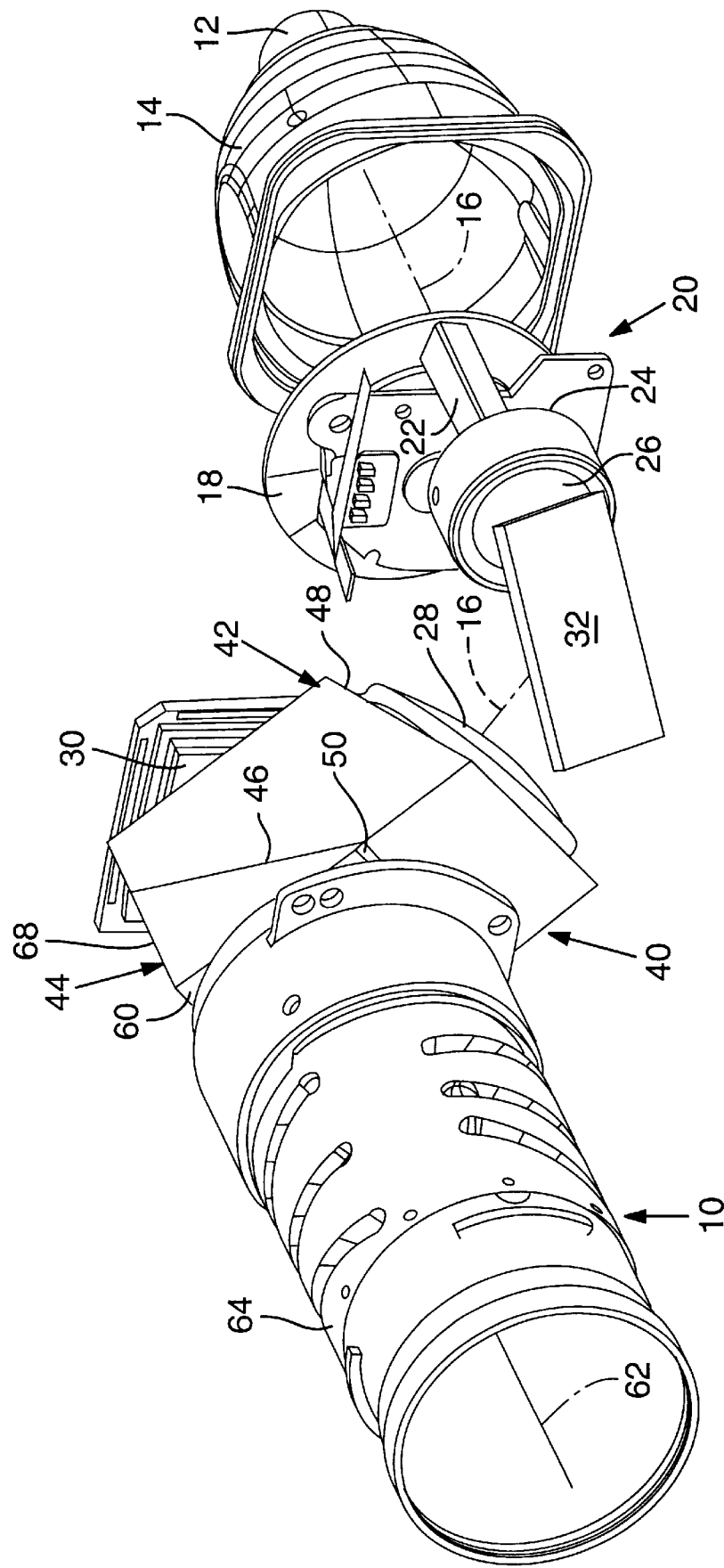
FIGS. 1A, 1B, 1C, and 1D are respective isometric, frontal, side elevation, and top plan views of a prior art image projector.
Figure 1B:
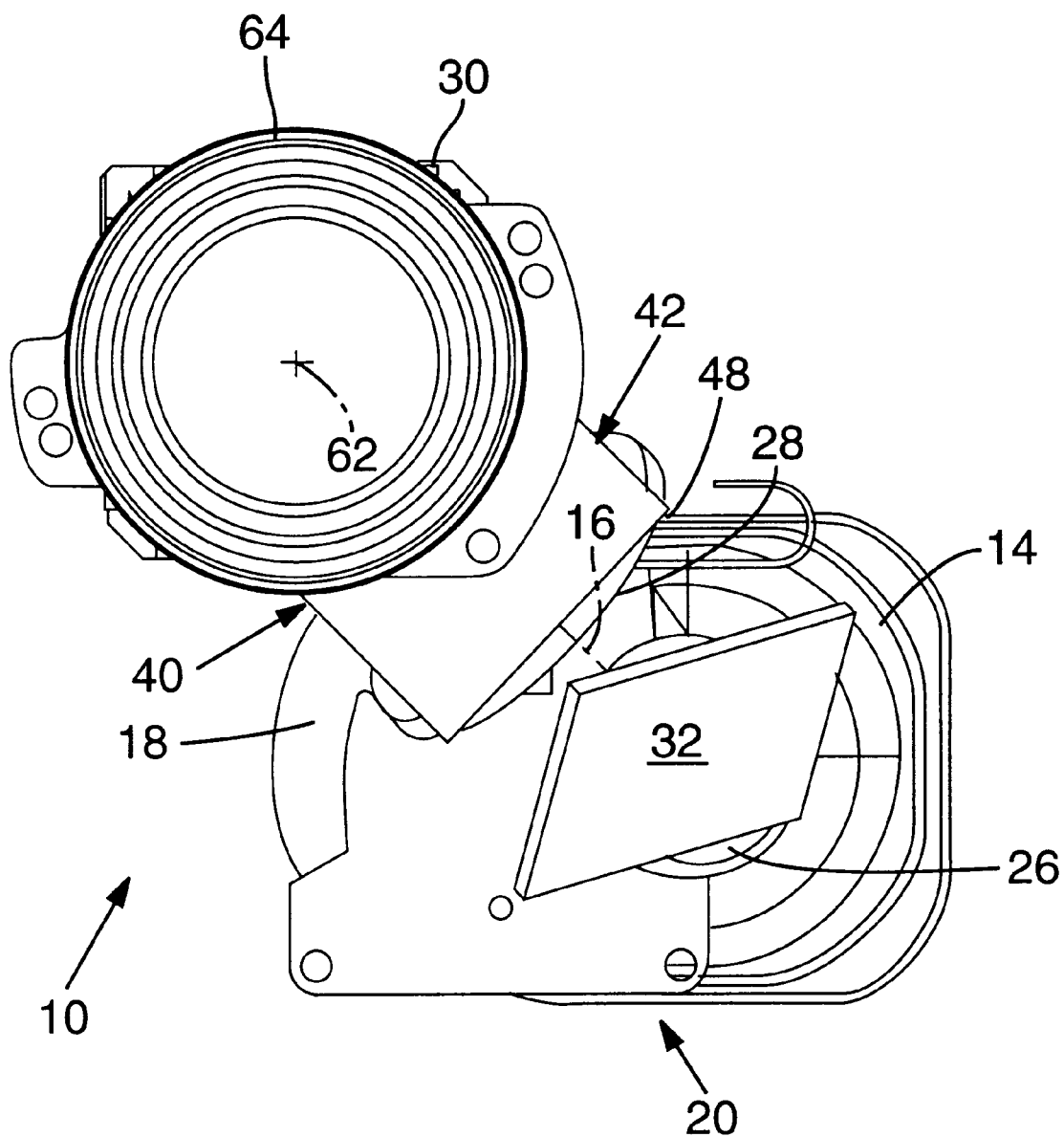
Figure 1C:
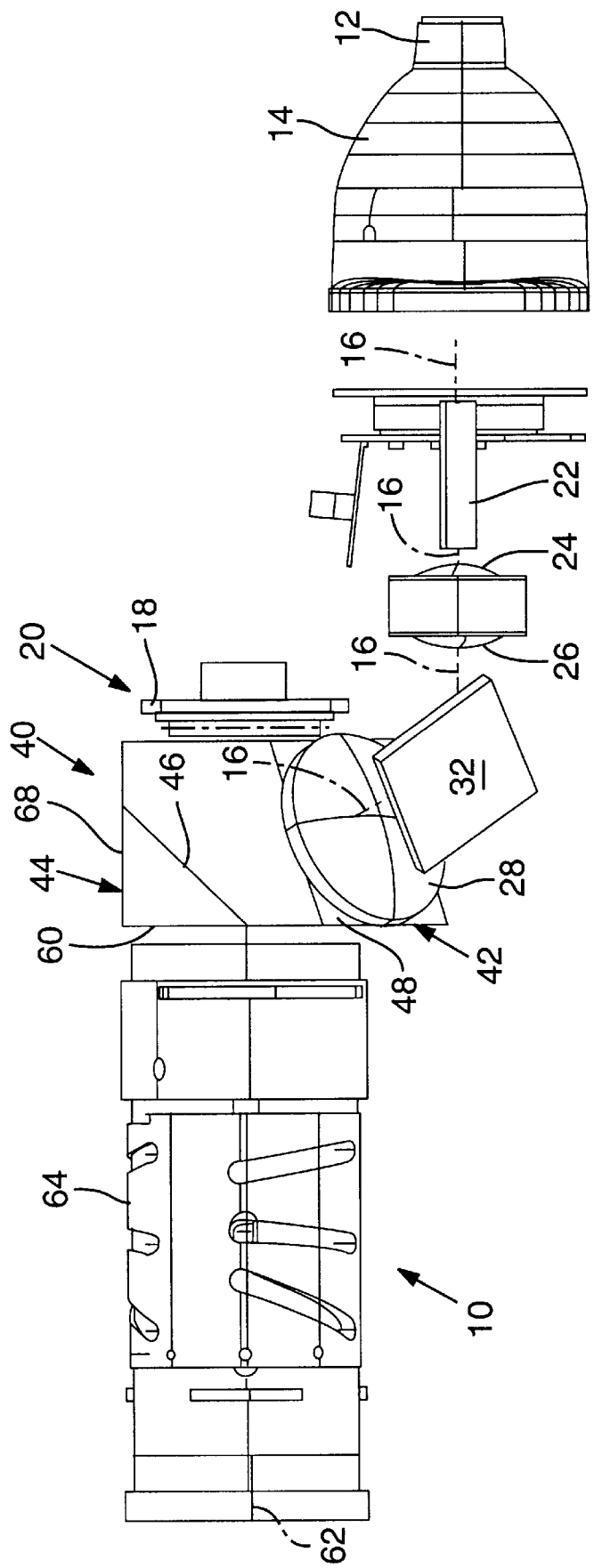
Figure 1D:
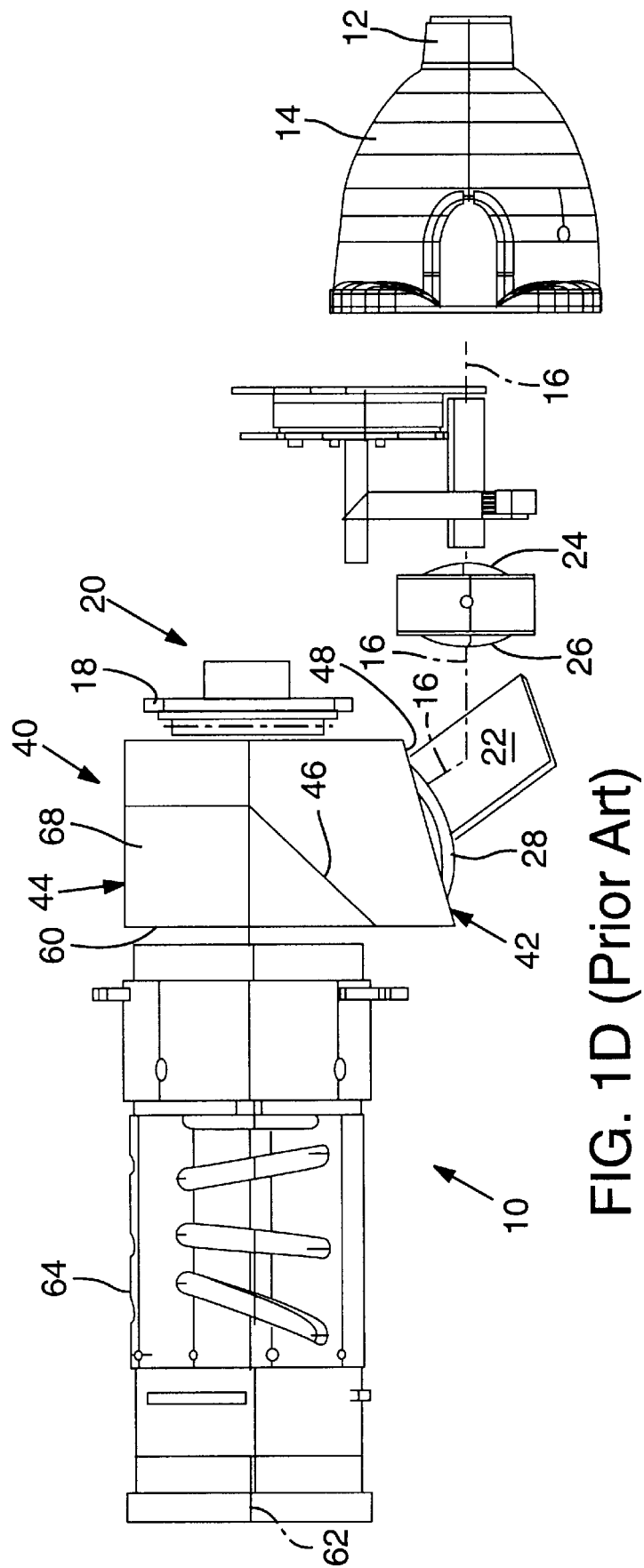
Figure 2A:
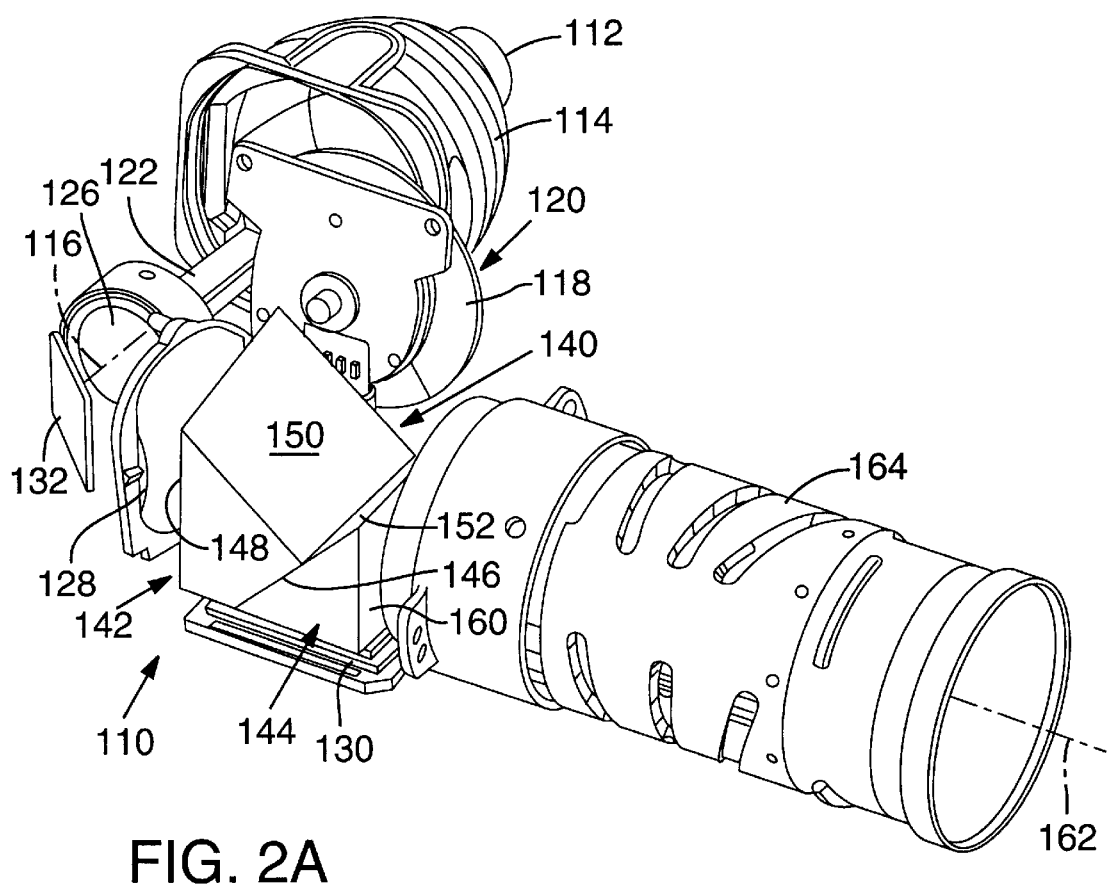
Figure 2B:
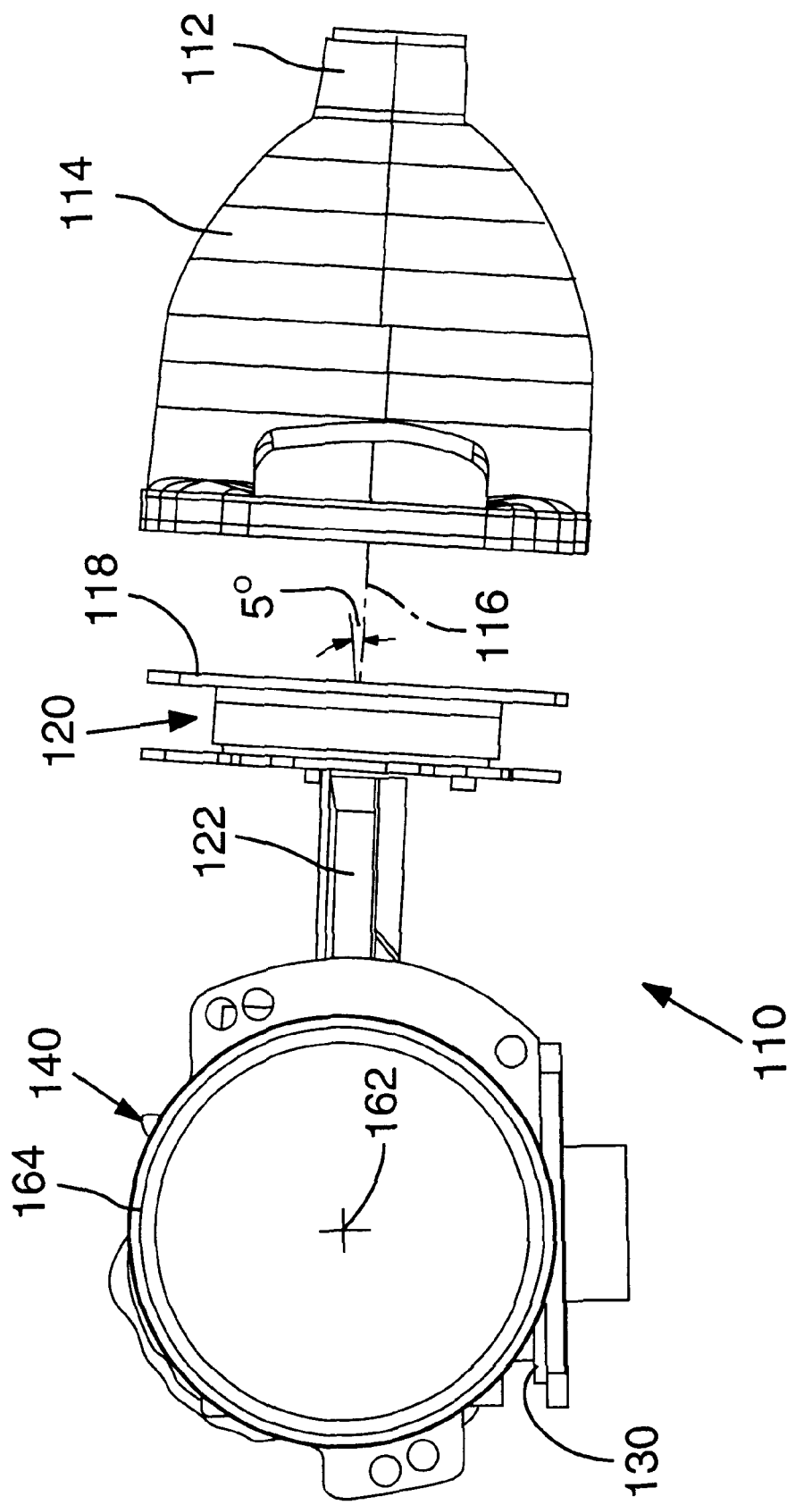
Figure 2C:
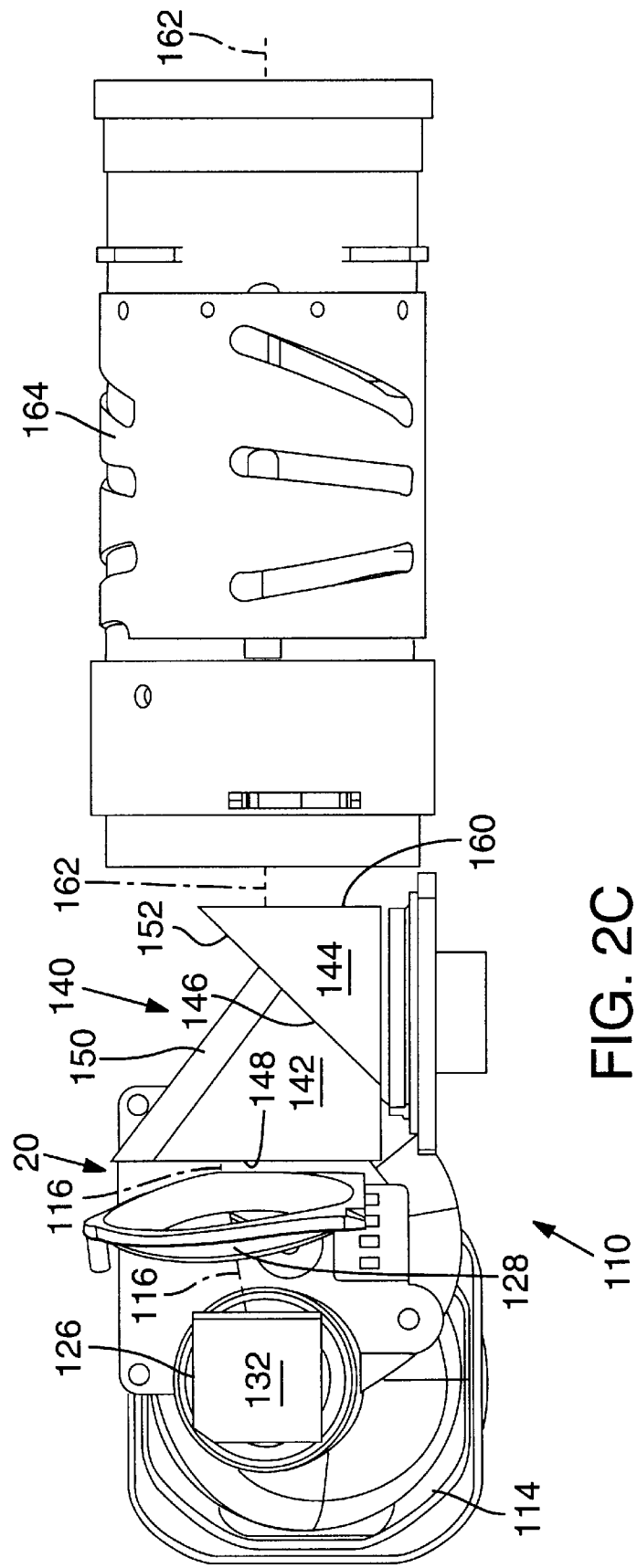
Figure 2E:
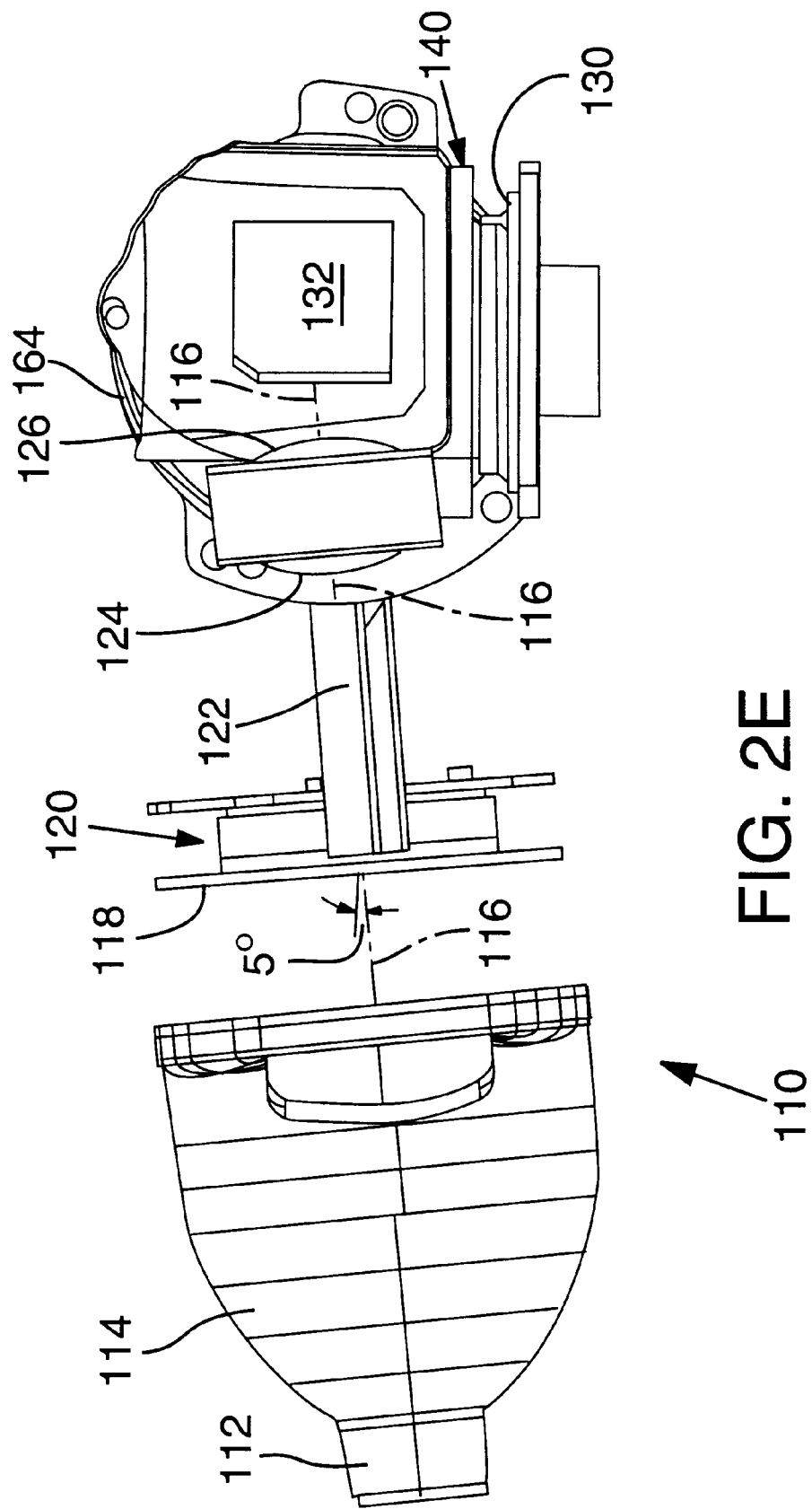

FIGS. 2A, 2B, 2C, 2D, and 2E are respective isometric, frontal, side elevation, top plan, and rear end views of a preferred embodiment of an image projection system 110 of the present invention. With reference to FIGS. 2A, 2B, 2C, 2D, and 2E, projection system 110 includes a high power lamp 112 positioned at a focus of an elliptical reflector 114 having an F-number of approximately F/1 to produce a high intensity illumination beam that is characterized by a principal ray 116. Lamp 112 is preferably a 120 watt, high pressure mercury lamp, which is suitable for use in an image projector to achieve its lifetime and lumen specifications. The mercury lamp has a nominal 1.3 mm arc gap, which contributes to high efficiency operation of the projector engine of image projection system 110. The small size of the arc gap impacts the alignment of the lamp arc to the rest of the optical system and increases the importance of the stability of the arc itself.

Lamp 112 is positioned at the first focus of elliptical reflector 114, which has a cold mirror that reflects forward only visible light. Much of the infrared and ultraviolet light is transmitted and absorbed in the housing of elliptical reflector 114. The second focus of elliptical reflector 114 is positioned one-half the distance between the front face of a rotating color wheel disk 118 of a color wheel assembly 120 and an integrator tunnel 122. As shown best in FIGS. 2B and 2E, elliptical reflector 114 is tilted upwardly 5 degrees from a horizontal datum plane to minimize the height of projection system 110. Color wheel disk 118 rotates at about 7,200 rpm, which is twice the system video image refresh rate, to sequentially display red, green, and blue images on a projector screen (not shown). Color wheel disk 118 may also include a white segment that functions to increase lumens while decreasing color saturation. All segments of color wheel disk 118 carry ultraviolet reflective coatings to prevent ultraviolet light from reaching ultraviolet light sensitive components in the optical system.

Integrator tunnel 122 creates at its output end a uniform illumination pattern and facilitates delivering the illumination light past the motor of color wheel assembly 120 so that the motor does not create a shadow in the illumination. Integrator tunnel 122 is composed of a solid glass rod that relies on total internal reflection to transfer light through it. Integrator tunnel 122 may also include a cladding that supports the integrator tunnel without disrupting total internal reflection. The uniform illumination pattern of light propagating from the output end of integrator tunnel 122 is of rectangular shape and is imaged through lens elements 124, 126, and 128 onto a light reflecting surface of a DMD 130. Integrator tunnel 122 is rotated 8 degrees about its major axis to correct for rotation in the illumination on DMD 130, which rotation is caused by a prism assembly 140 described below. DMD 130 is preferably a Texas Instruments Model DMD 1076 spatial light modulator composed of a rectangular array of aluminum micromechanical mirrors, each of which can be individually deflected at an angle of ±10 degrees about a hinged diagonal axis. The deflection angle (either positive or negative) of the mirrors is individually controlled by changing the memory contents of underlying addressing circuitry and mirror reset signals. Lens element 128 is tilted upwardly 6 degrees from the horizontal datum plane and rotated −10 degrees about the vertical axis to partly correct for distortion caused by oblique illumination of DMD 130. A beam direction turning mirror 132 positioned between an exit face of lens element 126 and an entrance face of lens element 128 turns the beam direction in an X-Z plane (FIGS. 3A–3D) by about 90 degrees within the housing of projection system 110.

Illumination light exiting lens element 128 enters a prism assembly 140 that is comprised of a first or compensating prism 142 and a second or output prism component 144 that are spaced apart by an air space interface 146. Prism assembly 140 allows DMD to lie flat when in operation. Prism assembly 140 sets up the correct illumination angle on DMD 130 and separates by total internal reflection discrimination the illumination light from the imaging light reflected by DMD 130 in its on-state. The illumination angles for DMD 130 are controlled by the angles of the faces of prism assembly 140. Prism assembly 140 refracts and reflects the incident light bundle so that the DMD 130 is illuminated from a corner with a projection angle partly built into the output light bundle. After the illumination light reflects off DMD 130 in its on-state, imaging light exits prism assembly 140 along essentially the same propagation direction as that of illumination light entering prism assembly 140. Because of the many degrees of freedom in prism assembly 140, light can enter it roughly parallel to a support table and in line with a projection lens. In a preferred case, the DMD can be placed on a large support surface and a single printed circuit board that covers the bottom of the projector. This provides a cost-effective solution because it eliminates the need for a high-density electrical connector otherwise required between the printed circuit board and an off-board DMD.

Figure 3A:
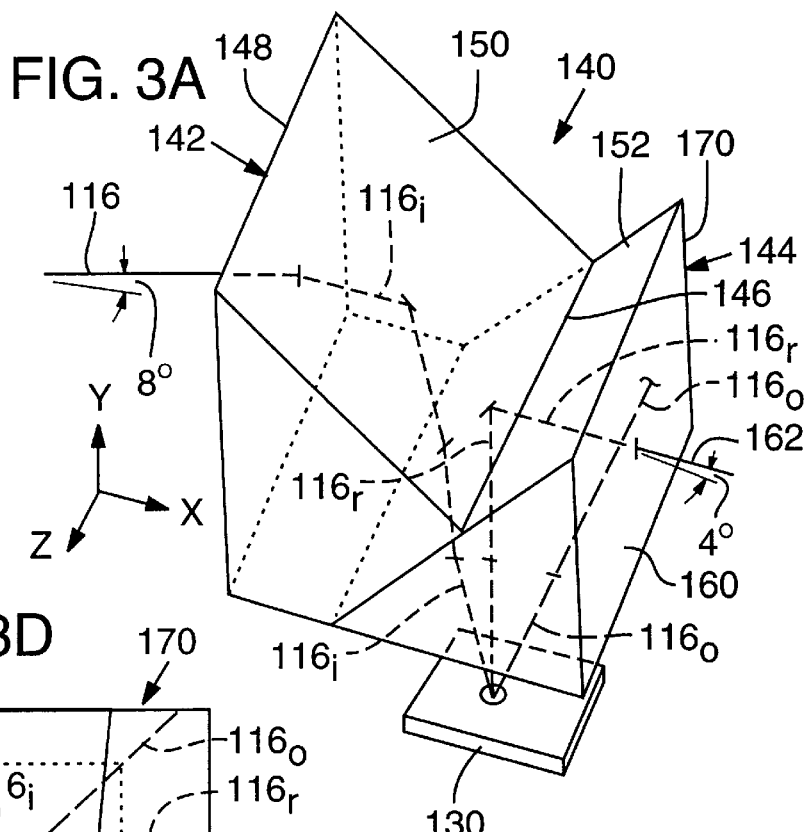
FIGS. 3A, 3B, 3C, and 3D are respective isometric, frontal, side elevation, and top plan views showing the spatial arrangement of a prism assembly and a reflective light modulator implemented in the embodiment of FIGS. 2A–2E.
Figure 3D:
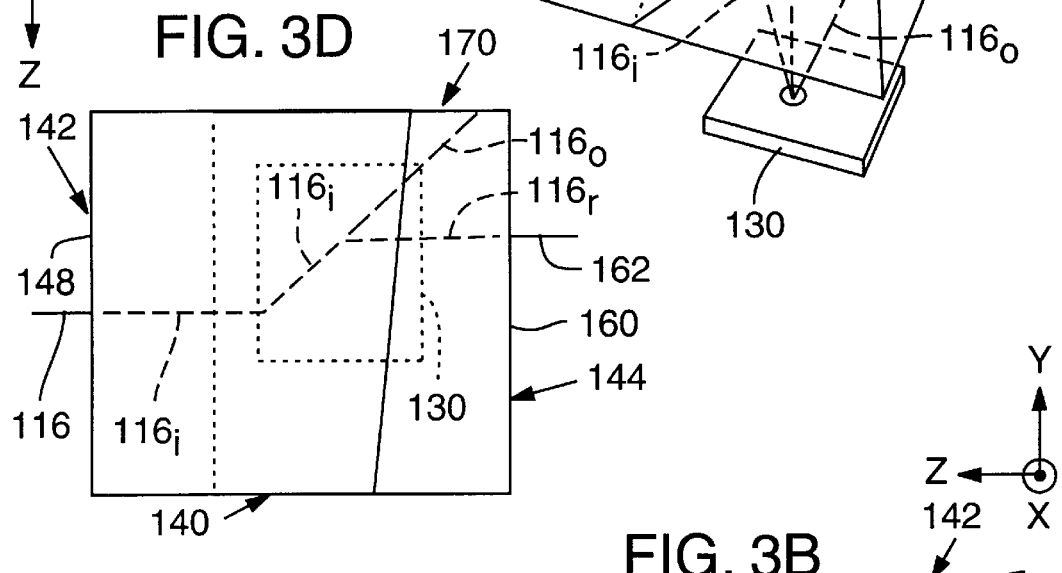
Figure 3C:
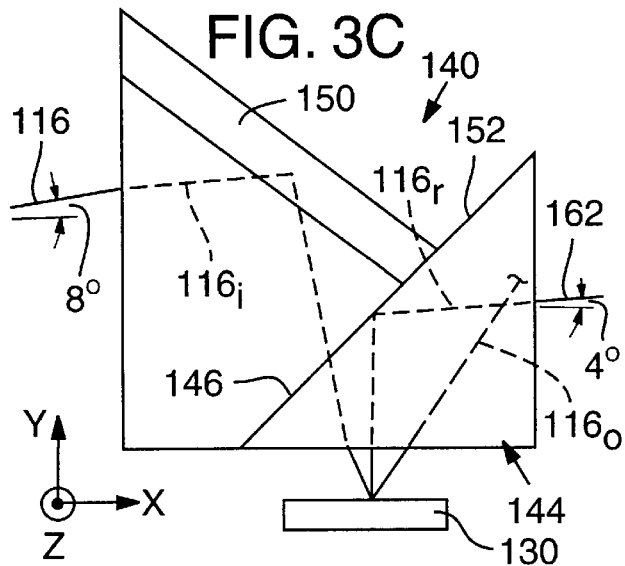
Figure 3B:
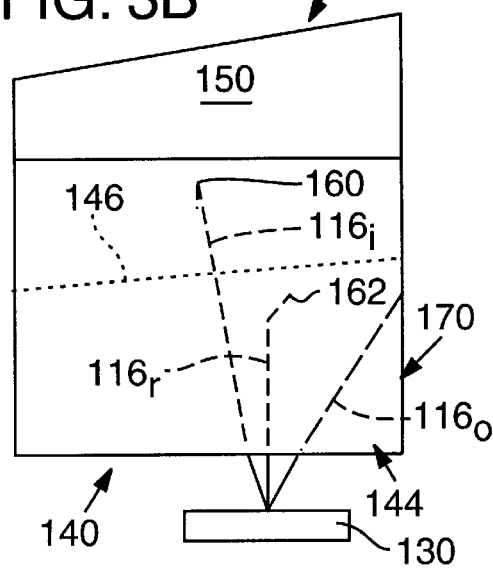

FIGS. 3A, 3B, 3C, and 3D are respective isometric, frontal, side elevation, and top plan views of prism assembly 140. With reference to FIGS. 3A, 3B, 3C, and 3D, principal ray 116 of the illumination beam propagates generally in the X direction and strikes an entrance surface 148 of prism component 142 upwardly at an 8 degree angle relative to a horizontal datum plane, which in FIGS. 3A, 3C, and 3D is the X-Z plane. An incident beam derived from principal ray 116 and characterized by a principal ray $116_i$ propagates through prism component 142 and, by total internal reflection, reflects off a top surface 150 of prism component 142. Top surface 150 of prism component 142 is set at a compound angle relative to the coordinate system (FIGS. 3A–3D and FIG. 4) that directs principal ray $116_i$ toward DMD 130 at a 24 degree angle measured relative to the normal of the X-Z horizontal plane and the projection of principal ray $116_i$ onto the X-Z plane at a 40 degree angle of rotation from the X-axis. The principal ray angle is less than the critical angle at the air gap interface surface that is characteristic of the glass from which prism component 142 is formed. Principal ray $116_i$ passes, therefore, without total internal reflection through air space interface 146 to strike DMD 130.

The controller, which is an integral component of DMD 130, provides electrical signals to direct the micromechanical mirrors of DMD 130 to the desired light reflecting states. In their on-state, the micromechanical mirrors of DMD 130 receive the incident beam and reflect an on-state reflected light beam characterized by a principal ray $116_r$. The micromechanical mirrors in their on-state reflect principal ray $116_r$ at a 4 degree angle relative to the normal of the X-Z horizontal plane and the projection of principal ray $116_r$ onto the X-Z horizontal plane is parallel to the X-axis. The 4 degree off-normal angle causes principal ray $116_r$ to strike a top surface 152 of prism component 144 at an angle that is greater than the characteristic critical angle of the glass from which prism component 144 is formed.

Principal ray $116_r$ by total internal reflection reflects off top surface 152 at air space interface 146 and propagates through prism component 144 to an exit surface 160. An imaging beam derived from principal ray $116_r$ of the on-state reflected light beam is characterized by a principal ray 162 and propagates through exit surface 160. Principal ray 162 propagates generally in the X direction, traveling upwardly at a +4 degree angle relative to the X-Z plane. The imaging beam propagates toward a projection lens 164 to a projector screen (not shown) to display an image to a viewer.

In their off-state, the micromechanical mirrors of DMD 130 receive the incident beam and reflect an off-state reflected light beam characterized by a principal ray $116_o$. The micromechanical mirrors in their off-state reflect principal ray $116_o$ at a 44 degree angle relative to the normal of the X-Z horizontal plane and the projection of principal ray $116_o$ onto the X-Z horizontal plane at a 42 degree angle of rotation from the X-axis. The 44 degree angle causes principal ray $116_o$ to propagate onto a side surface 170 of prism component 144. Side surface 170 is coated with an absorptive coating such as black paint, so that principal ray $116_o$ will not be internally reflected by side surface 170, but will be absorbed by the absorptive coating. The absorptive coating functions to prevent off-state light from otherwise reflecting by total internal reflection off side surface 170 and entering projection lens 164 as stray light. The stray light would scatter inside the lens barrel, propagate through projection lens 164, and be projected onto the display screen.

Figure 4:
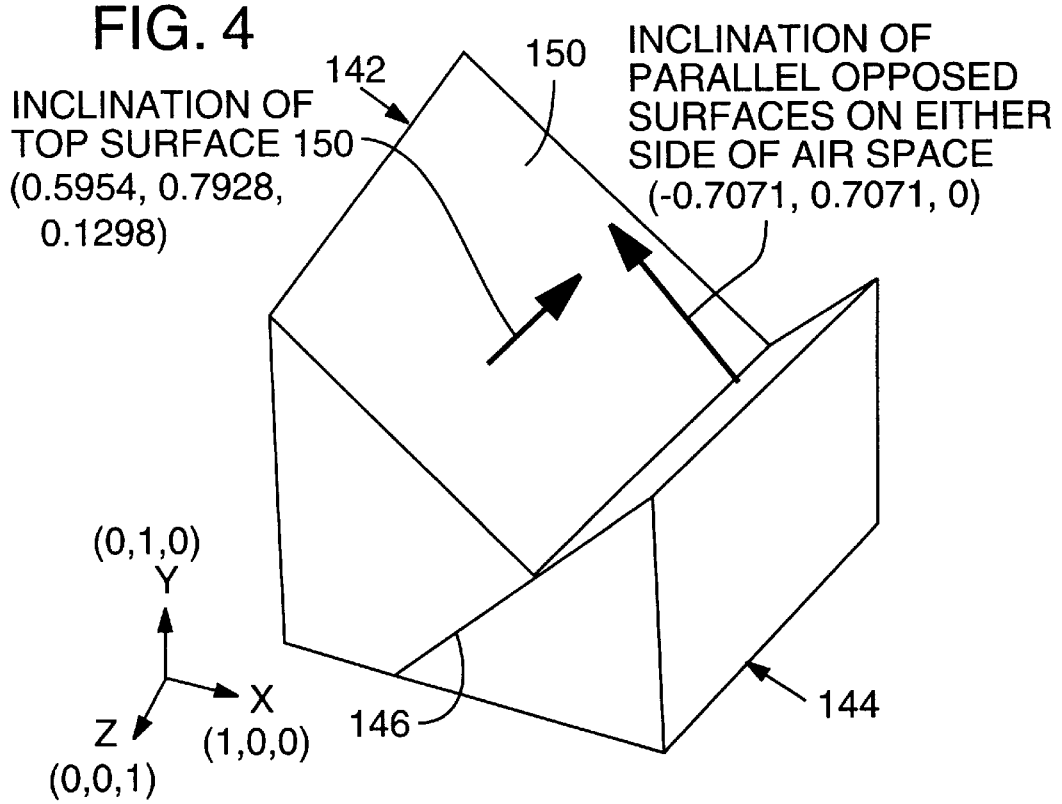
FIG. 4 is a diagram showing the coordinate system for the prism assembly of FIGS. 3A–3D.

FIG. 4 is a diagram showing the DMD coordinate system for prism assembly 140. FIG. 4 indicates the coordinate vector directions defining the angular inclination of top surface 150 of prism component 142, which establishes the illumination angle for DMD 130 and the vector direction of the parallel opposed surfaces of prism components 142 and 144 at air space interface 146. Air space interface 146 has a thickness controlled by spacer balls embedded in bonding material or by other means. The bonding material is placed outside the optically active area.

Figure 5:
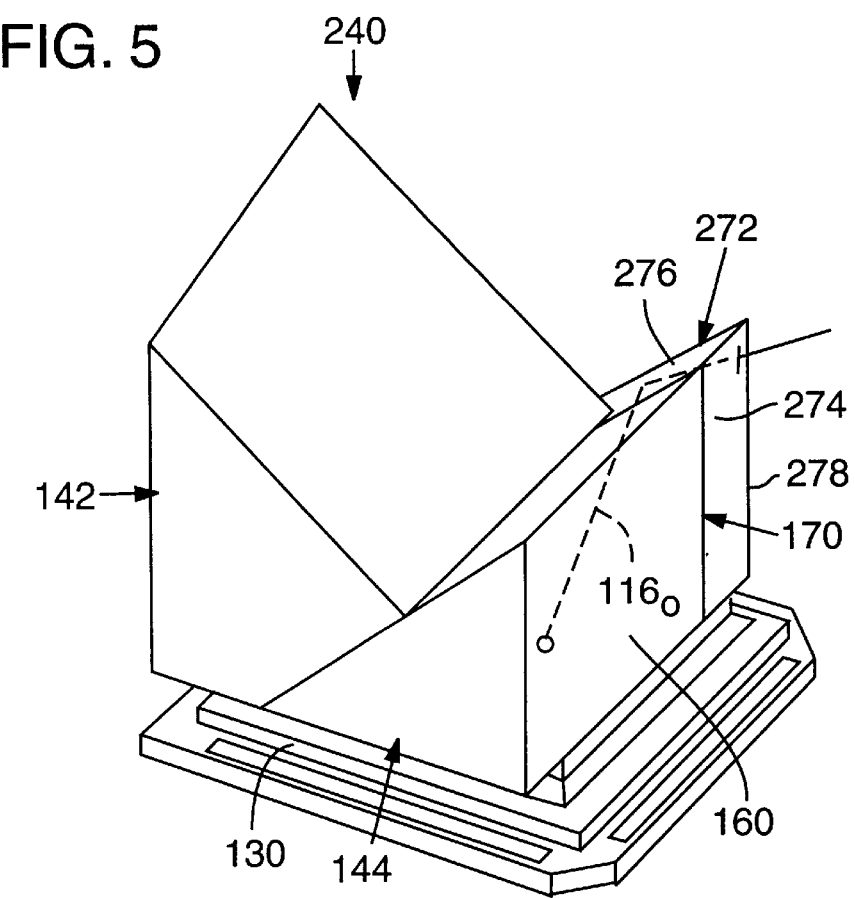
FIG. 5 is an isometric view of a prism assembly that implements in the prism assembly of FIGS. 3A–3D a light window for unwanted light to escape from the prism assembly in a direction away from the projector lens.

FIG. 5 is an isometric view of an embodiment constituting a version of prism assembly 140 having a light escape window area. With reference to FIG. 5, a prism assembly 240 includes compensating prism 142 and output prism 144 described above in connection with prism assembly 140, with a third prism component 272 optically bonded to side surface 170 of prism component 144. The refractive indices of the cement and the opposed surfaces of prism components 144 and 272 are matched sufficiently to prevent high reflection at the glass-cement-glass interfaces. Prism component 272 effectively extends by about 20 percent the length of output prism 144 to allow the unwanted, off-state light to upwardly propagate through, and thereby not reflect at, a location represented by side surface 170. Prism component 272 has a front surface 274 that functions as a light window for the unwanted, off-state light to escape prism assembly 240 so that off-state light is directed away from projection lens 164 (FIG. 2D). The light window allows the unwanted, off-state light to reach and totally internally reflect off a top surface 276 of prism component 272 rather than a side surface 278 of prism component 272, thereby eliminating a need for an absorptive coating on side surface 278. Eliminating a need for applying an absorptive coating on the prism assembly embodiment shown in FIGS. 3A, 3B, 3C, and 3D is desirable because an absorptive coating would tend to impart on prism assembly 140 thermal stresses that result in assembly deformation and misalignment. Removing the unwanted, off-state light by the presence of light window 274 also prevents unacceptable levels of stray light from degrading the quality of the projected image propagating through projection lens 164. Skilled persons will appreciate that prism component 144 can be configured in an integrated design in which a single prism component has the shape of the exterior surfaces resulting from the bonding together of prism components 144 and 272.

In either implementation, prism assembly 240 provides three-point structural stability when mounted in a projection system housing.

Figure 6A:
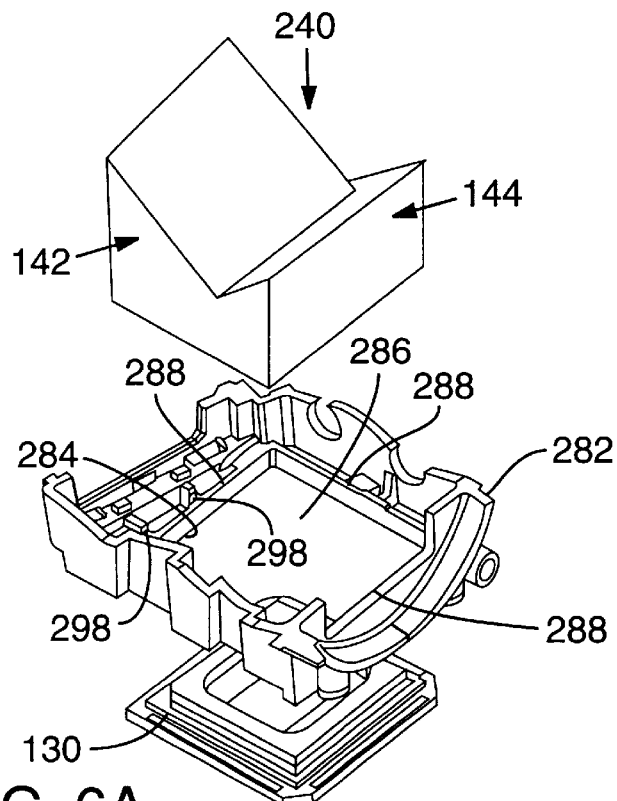
FIG. 6A is an exploded fragmentary isometric view showing the spatial arrangement of the DMD mounted below and the prism assembly of FIG. 5 (with a light escape window area as an integral part of the output prism component) mounted in an optics chassis that is mountable in the projection system of FIGS. 2A–2E.

FIGS. 6A–6D illustrate the nature of the structural stability prism assembly 240 affords. FIG. 6A shows the spatial arrangement of DMD 130 mounted against an exterior bottom surface of, and prism assembly 240 fitted within, an optical component or optics chassis 282.

Figure 6B:
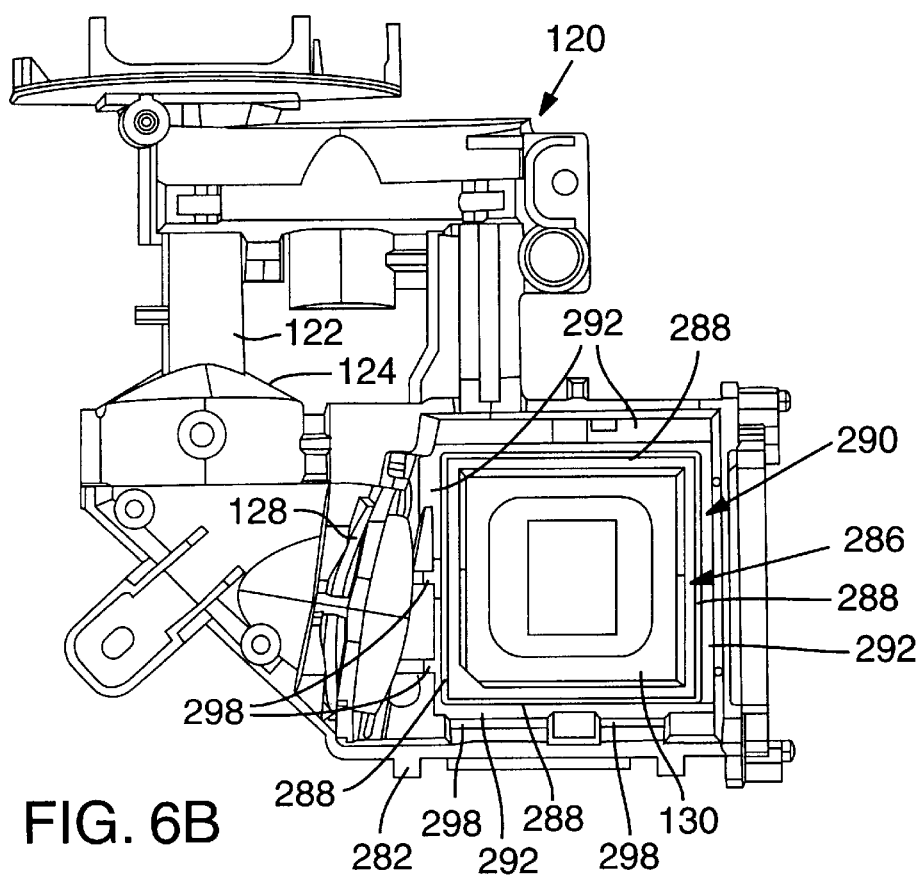
FIGS. 6B and 6C are top plan views of an optics chassis, respectively, with and without the prism assembly of FIGS. 3A–3D installed.
Figure 6C:
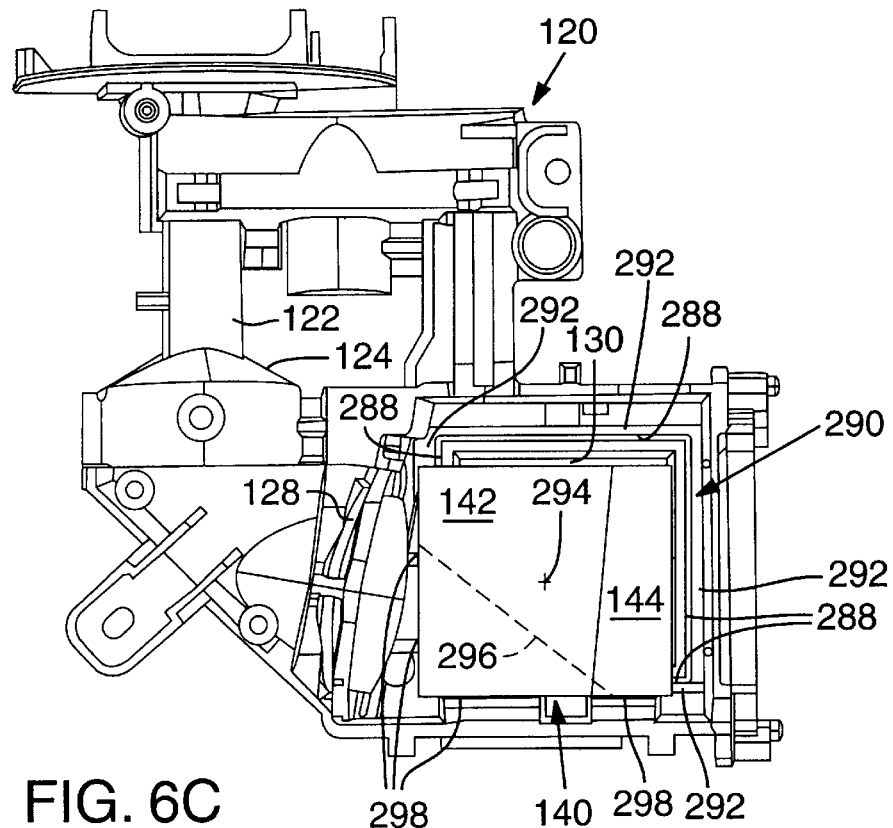

FIGS. 6B and 6C show top plan views of optics chassis 282, respectively, with and without prism assembly 140 installed. With particular reference to FIG. 6B, optics chassis 282 includes in a bottom surface 284 a rectangular opening 286 defined by boundary lines 288. Opening 286 receives DMD 130 so that its light reflecting surface is aligned with and spaced apart from prism assembly 140. A rectangular support frame 290 formed by four raised linear base landings 292 and set back from boundary lines 288 provides a base landing for prism assembly 140. With particular reference to FIG. 6C, the active part of prism assembly 140 does not overlap rectangular opening 286 provided for DMD 130 in optics chassis 282; therefore, the base plane of prism assembly 140 rests on only two of the base landings 292. This leads to slight tilt variations in the final position of prism assembly 140 as it is located in optics chassis 282 during manufacturing and thereby results in distortions in the projected image. Moreover, because a center of gravity 294 of prism assembly 140 extends beyond an edge line 296 of the base support plane created by the two base landings, prism assembly 140 is not dynamically stable and is vulnerable to high loads resulting from impact and vibration. Edge line 296 represents, therefore, a line of rotation of prism assembly 140 when it is mounted in optics chassis 282.

Figure 6D:
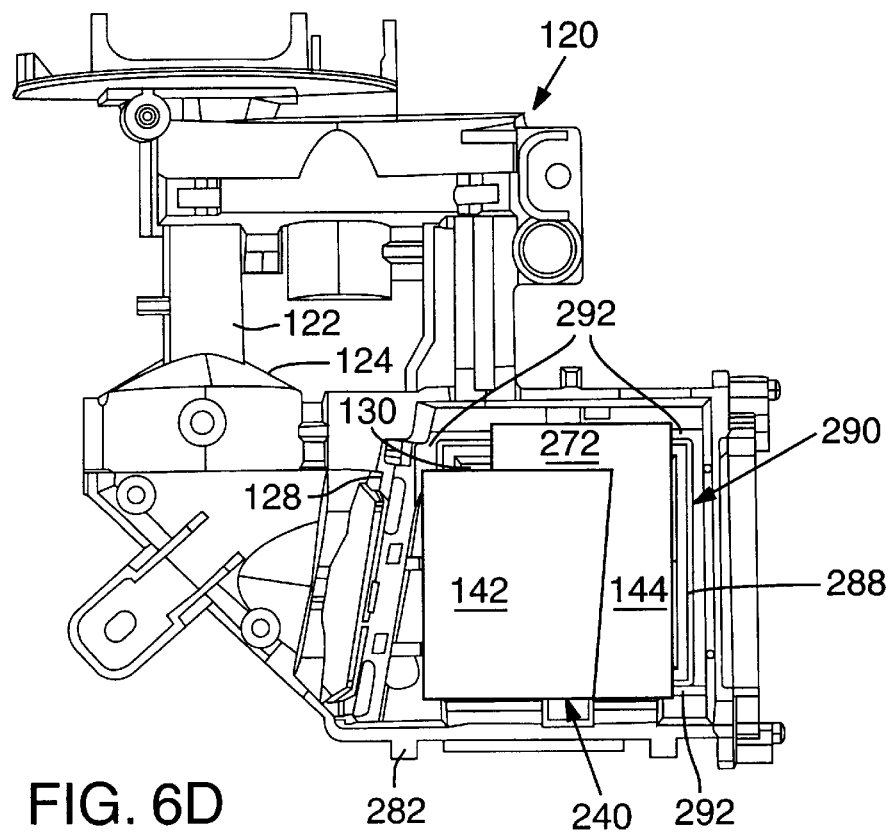
FIG. 6D is a top plan view of the optics chassis with the prism assembly of FIG. 5 installed.

FIG. 6D shows a top plan view of optics chassis 282 with prism assembly 240 installed. With reference to FIG. 6D, the presence of prism 272, either optically fixed to or formed as an integral part of output prism 144, effectively extends prism assembly 240 to cover a third base landing 292. This added support point greatly reduces tilt variations and substantially improves the structural support of prism assembly 240 in optics chassis 282.

Optics chassis 282 supports prism assembly 240 using a tertiary datum system that includes three base landings 292 and four side landings 298 positioned on the inner surfaces of adjacent optics chassis sidewalls 300. Base landings 292 and side landings 298 create three mutually perpendicular datum planes within optics chassis 282, to which prism assembly 240 is attached.

Figure 7A:
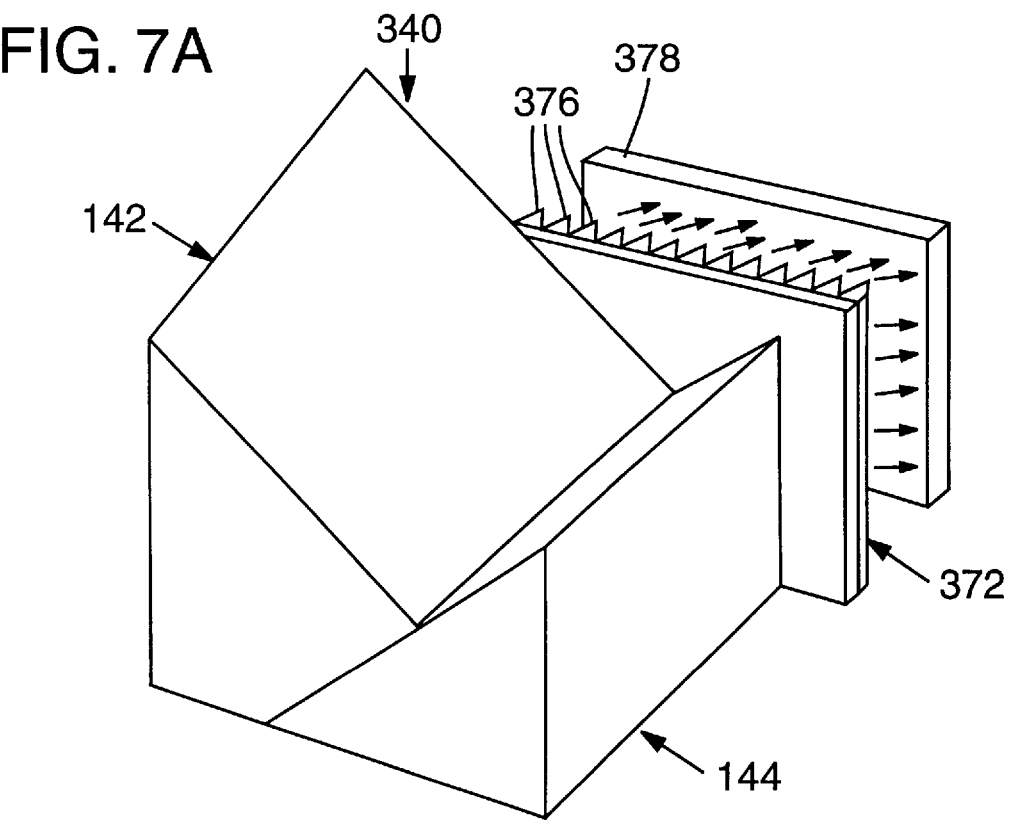
FIGS. 7A and 7B are respective side and frontal isometric views showing an alternative design for the prism assembly of FIGS. 3A–3D.
Figure 7B:
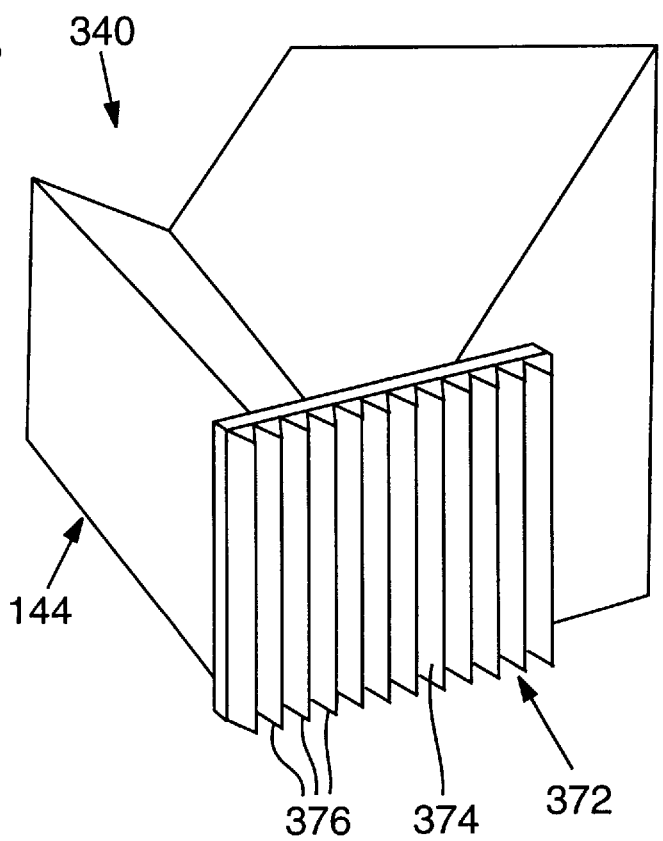

FIGS. 7A and 7B are respective side and front isometric views showing an alternative design for prism assembly 140, which is implemented with a light escape window. With reference to FIGS. 7A and 7B, a prism assembly 340 substitutes for third prism component 272 a molded, faceted array 372 that is optically cemented to side surface 170 of prism component 144. A face 374 of multiple facets 376 disperses the unwanted, off-state light as it exits side surface 170 of prism component 144 and propagates into a light absorber 378. This is achieved by adding curvature to the facets 376 or by varying the face tilt angle of each facet 376 to refract the unwanted, off-state light to different locations on absorber 378. The result is diminishing the concentration of incident light at any location on absorber 378 and to minimize an increase in its temperature and thereby mitigate thermal problems in image projection system 110.

It will be obvious to those having skill in the art that many changes may be made to the details of the above-described embodiments of this invention without departing from the underlying principles thereof. For example, although they are described with reference to image projection systems, the prism assembly designs and arrangements of the invention can be advantageously implemented in other types of image display systems. The scope of the present invention should, therefore, be determined only by the following claims.

What is claimed is:

1. In an image display system that includes a light source from which a first light beam characterized by a first principal ray propagates in a first direction and a reflective light modulator which responds to a control signal to selectively change an optical property of incident light derived from the first light beam and thereby provide an information-carrying light beam for display on a display screen, the improvement comprising:

an angle-dependent beam separator comprised of multiple optical elements, the beam separator positioned to receive the first light beam and constructed so that an incident light beam derived from the first light beam propagates along a first travel path within the beam separator and strikes the reflective light modulator at an angle of incidence, the reflective light modulator responding to the control signal to selectively reflect the incident light beam at a controlled angle of reflection that differs from the angle of incidence of the incident light beam to provide an on-state reflected light beam that propagates along a second travel path within the beam separator and exits the beam separator to form a second light beam characterized by a second principal ray that propagates in a second direction, the optical elements having shapes and surface angles that cause the first and second travel paths and the first and second principal rays of the respective first and second light beams not to lie in a common plane.

2. The image display system of claim 1 in which the multiple optical elements of the beam separator comprise first and second prism components having respective first and second opposed surfaces separated by an angular discrimination region, and in which the first principal ray characterizing the first light beam enters the beam separator through an entrance surface of the first prism component and the second principal ray characterizing the second light beam is formed upon exiting the beam separator through an exit surface of the second prism component;

the incident light beam being derived from the first principal ray as it enters the entrance surface of the first prism component and propagating along the first travel path in a discontinuous direction by reflection off of a reflection surface of the first prism component, propagation through the angular discrimination region without undergoing total internal reflection, and propagation through a transmission surface of the second prism component to strike the reflective light modulator at the angle of incidence; and the on-state reflected light beam propagating along the second travel path in a discontinuous direction by reflection off of the reflective light modulator, propagation through the second prism component to the angular discrimination region, reflection by total internal reflection off the second opposed surface of the second prism component, and propagation through the second prism component to produce the second principal ray as it exits the exit surface of the second prism component.

3. The image display system of claim 2 in which the angular discrimination region is an air gap.

4. The image display system of claim 1 in which the reflective light modulator comprises a spatial light modulator of a Digital Micromirror Device type.

5. The image display system of claim 4 in which the angle of incidence and a maximum value of the controlled angle of reflection are separated by an acute angle.

6. The image display system of claim 2 in which the first opposed surface of the first prism component is tilted at a compound angle relative to the entrance surface and the reflective light modulator to cause the incident light beam to propagate toward and strike the reflective light modulator at the angle of incidence.

7. The image display system of claim 2 in which:

the first principal ray characterizing the first light beam enters the beam separator through an entrance surface of the first prism component and the second principal ray characterizing the second light beam is formed upon exiting the beam separator through an exit surface of the second prism component;

a light escape surface adjoins the exit surface of the second prism component; and the reflective light modulator reflects off-state light at controlled angles other than the controlled angle of reflection of the on-state reflected light, the light escape surface angularly positioned relative to the exit surface to allow substantially all of the off-state light to refract out of the second prism component and thereby escape from the beam separator without passing through the exit surface.

8. The image display system of claim 7, further comprising a third prism component affixed to a surface of the second prism component and including the light escape surface.

9. The image display system of claim 8 in which the light escape surface is multi-faceted.

10. The image display system of claim 7, further comprising a faceted array component affixed to a surface of the second prism component and including a multi-faceted surface that functions as the light escape surface.

11. The image display system of claim 7, further comprising a projection lens through which the on-state reflected light travels.

12. An image display system, comprising:

a light source from which an illumination light beam propagates;

a reflective light modulator responsive to a control signal to selectively reflect incident light at controlled angles of reflection;

a prism assembly positioned between the light source and the reflective light modulator so that the illumination light beam enters and propagates through the prism assembly, strikes the reflector light modulator, and reenters the prism assembly as a reflected imaging light beam that propagates through and exits the prism assembly as an imaging light beam; and the prism assembly including first and second prism components separated by an angular discrimination region, the first prism component having an entrance surface on which the illumination light beam is incident at an angle defined by an illumination beam vector direction and the second prism component having an exit surface from which the imaging light beam propagates from the prism assembly at an angle defined by an imaging beam vector direction, and the first and second prism components having shapes and surface angles that cooperate to produce propagation of the imaging light beam so that the illumination and imaging beam vector directions are substantially the same.

13. The image display system of claim 12 in which:

the illuminating beam propagating through the prism assembly propagates through the angular discrimination region without total internal reflection and exits the second prism component to strike the reflective light modulator; and the reflected imaging light beam reentering the prism assembly propagates within the second prism component, reflects by total internal reflection at the angular discrimination region, and exits the exit surface of the second prism component.

14. The image display system of claim 13 in which the second prism assembly is optically associated with a light escape window surface and the reflective light modulator in a first light reflecting state causes the reflected imaging light beam at a first controlled angle of reflection to reenter the prism assembly and in a second light reflecting state causes a reflected, unwanted light beam at a second controlled angle of reflection to propagate through the light escape window surface.

15. The image display system of claim 14 in which the light escape window surface is formed on a prism surface that is an integral part of the second prism component.

16. The image display system of claim 15 in which the light escape window surface includes multiple areas of which one is a part of the exit surface.

17. The image display system of claim 14 in which the light escape window surface is formed on a third prism component that is optically coupled to the second prism component.

18. The image display system of claim 14 in which the light escape window surface is formed on a multifaceted array that is optically coupled to the second prism component.

* * * * *